United States Patent [19]
Dilger

[11] Patent Number: 5,970,778
[45] Date of Patent: *Oct. 26, 1999

[54] THERMALLY ACTIVATED CALIBRATION SYSTEM FOR CHEMICAL SENSORS

[75] Inventor: John Patrick Dilger, Marshalltown, Iowa

[73] Assignee: Fisher Controls International, Clayton, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/967,870

[22] Filed: Nov. 12, 1997

[51] Int. Cl.⁶ .................................................. G12B 13/00
[52] U.S. Cl. .................................................. 73/1.05
[58] Field of Search ................... 73/1.57, 1.02, 73/1.03, 1.05, 1.06, 40; 222/3, 146.2, 146.4, 146.5

[56] References Cited

U.S. PATENT DOCUMENTS

| | | |
|---|---|---|
| 3,290,920 | 12/1966 | Novak ........................................ 73/1.03 |
| 3,516,278 | 6/1970 | Klein et al. ................................ 73/1.05 |
| 3,760,773 | 9/1973 | Christensen . |
| 4,164,861 | 8/1979 | Schlereth et al. . |
| 4,172,378 | 10/1979 | Limp . |
| 4,713,618 | 12/1987 | Carlson et al. . |
| 4,742,708 | 5/1988 | Porter . |
| 5,028,394 | 7/1991 | Lowell, Jr. et al. . |
| 5,094,958 | 3/1992 | Klainer et al. . |
| 5,185,263 | 2/1993 | Kroneis et al. . |
| 5,262,127 | 11/1993 | Wise et al. . |
| 5,385,709 | 1/1995 | Wise et al. . |
| 5,447,688 | 9/1995 | Moore . |
| 5,550,053 | 8/1996 | Salpeter . |

*Primary Examiner*—Robert Raevis
*Attorney, Agent, or Firm*—Marshall, O'Toole, Gerstein, Murray & Borun

[57] ABSTRACT

A device for remotely calibrating leak sensors. A supply of liquid analyte calibrant is stored in a reservoir, and is communicated to an outlet nozzle by a conduit having a throughbore. The conduit terminates in an outlet nozzle, and portion of the conduit defines a dosing chamber for storing a measured dose of the liquid calibrant. A thermal activator such as a resistive coil or a radio frequency unit is disposed adjacent the dosing chamber for applying a steep thermal gradient in order to bring the calibrant quickly to its boiling point such that the measured quantity is ejected from the outlet nozzle.

20 Claims, 1 Drawing Sheet

5,970,778

THERMALLY ACTIVATED CALIBRATION SYSTEM FOR CHEMICAL SENSORS

FIELD OF THE INVENTION

The present invention relates to a calibration system for chemical sensors. More specifically, the present invention relates to a thermally actuated calibration device which delivers a metered dose of calibrant from a dosing chamber.

BACKGROUND OF THE INVENTION

Industrial manufacturing, processing and storage facilities such as chemical plants, refineries and shipping terminals typically include a vast network of piping systems for transporting the raw or finished products through the facility. Such piping systems necessarily include a number of valves for controlling the flow of material through the facility.

Many of the products handled in the aforementioned plants are hazardous volatile organic compounds (VOC's). Unfortunately, the valves used to control the flow of material through the plants typically experience a certain amount of undesired leakage referred to as "fugitive" emissions. Fugitive emissions, which are regulated by the Environmental Protection Agency (EPA), frequently occur around the packing between the valve stem and the body of the valve. These fugitive emissions must be monitored in order to comply with EPA emission regulations. Accordingly, leak detectors are placed near the valves, usually adjacent to the leak prone valve stems or other non-point sources, in order to monitor the leakage rate.

In order to obtain accurate readings, the leak detectors must be calibrated on a periodic basis, which typically must be accomplished from a remote location. One method of calibrating such leak detectors is to eject a small quantity of calibrant adjacent to the leak detector. The detector reading is then compared to a standard based on empirical data or a look up table, and the detector is adjusted accordingly.

SUMMARY OF THE INVENTION

According to one aspect of the present invention, a leak sensor calibration device includes a reservoir for storing a liquid analyte calibrant. A conduit is in flow communication with the reservoir, and a portion of the conduit defines a dosing chamber for storing a precisely measured quantity of the calibrant. An outlet nozzle, which is typically located closely adjacent to the leak sensor to be calibrated, is in flow communication with the dosing chamber. A thermal activator, preferably a resistive coil or radio frequency unit capable of applying a steep thermal gradient, surrounds the dosing chamber. Upon energizing the thermal activator, the measured quantity of calibrant stored in the dosing chamber is ejected through the outlet nozzle. The leak sensor is then calibrated by comparing the actual reading to a standard formula based on empirical data.

In further accordance with the preferred embodiment, the device includes a first remotely operated valve at the outlet nozzle and a second remotely operated valve between the reservoir and the dosing chamber. The valves prevent inertial dispersion of the calibrant under seismic conditions, and also prevent free surface evaporation. The outlet valve and nozzle ideally are located higher than the second valve, which keeps the calibrant out of contact with the soft rubber, Viton coated valve seat, thus preventing "off-gassing." When the thermal activator is energized by a control system, the control system opens the outlet valve and closes the valve between the dosing chamber and the reservoir, which prevents calibrant from flowing back to the reservoir. The thermal activator is preferably capable of bringing the calibrant within the dosing chamber to its boiling point in about 10 milliseconds.

In accordance with another aspect of the invention, a device for delivering a metered quantity of vaporized liquid material to the surrounding atmosphere includes a storage reservoir and a conduit in flow communication with the reservoir. A portion of the conduit defines a dosing chamber for storing a metered quantity of the liquid material. The portion of conduit between the reservoir and the dosing chamber includes an impeding portion for restricting the flow of the liquid material from the dosing chamber back to the reservoir. The end of the conduit defines outlet nozzle in flow communication with the dosing chamber, and a thermal activator adjacent the dosing chamber applies a steep thermal gradient which vaporizes the liquid material in the dosing chamber thereby ejecting the vaporized material through the outlet nozzle to the atmosphere.

In accordance with yet another aspect of the invention, a remotely operable calibrating device includes a reservoir for storing a supply of liquid calibrant, and has a conduit in flow communication with the storage reservoir. The conduit terminates in an outlet nozzle and has a central portion defining a dosing chamber which stores a measured quantity of the liquid calibrant. A thermal activator is used to heat the liquid calibrant in the dosing chamber to its boiling point. A valve isolates the outlet nozzle from the surrounding atmosphere when the thermal activator is inactive, and when the thermal activator is energized the valve system isolates the dosing chamber from the reservoir, thus preventing liquid in the dosing chamber from being routed back into the reservoir. A remotely operable control system is connected to the valve system and the thermal activator for controlling the operation of the device.

Further advantages and features of the present invention will become evident to those skilled in the art upon a reading of the following description.

DETAILED DESCRIPTION OF THE PREFERRED EMBODIMENT

Figure 1:
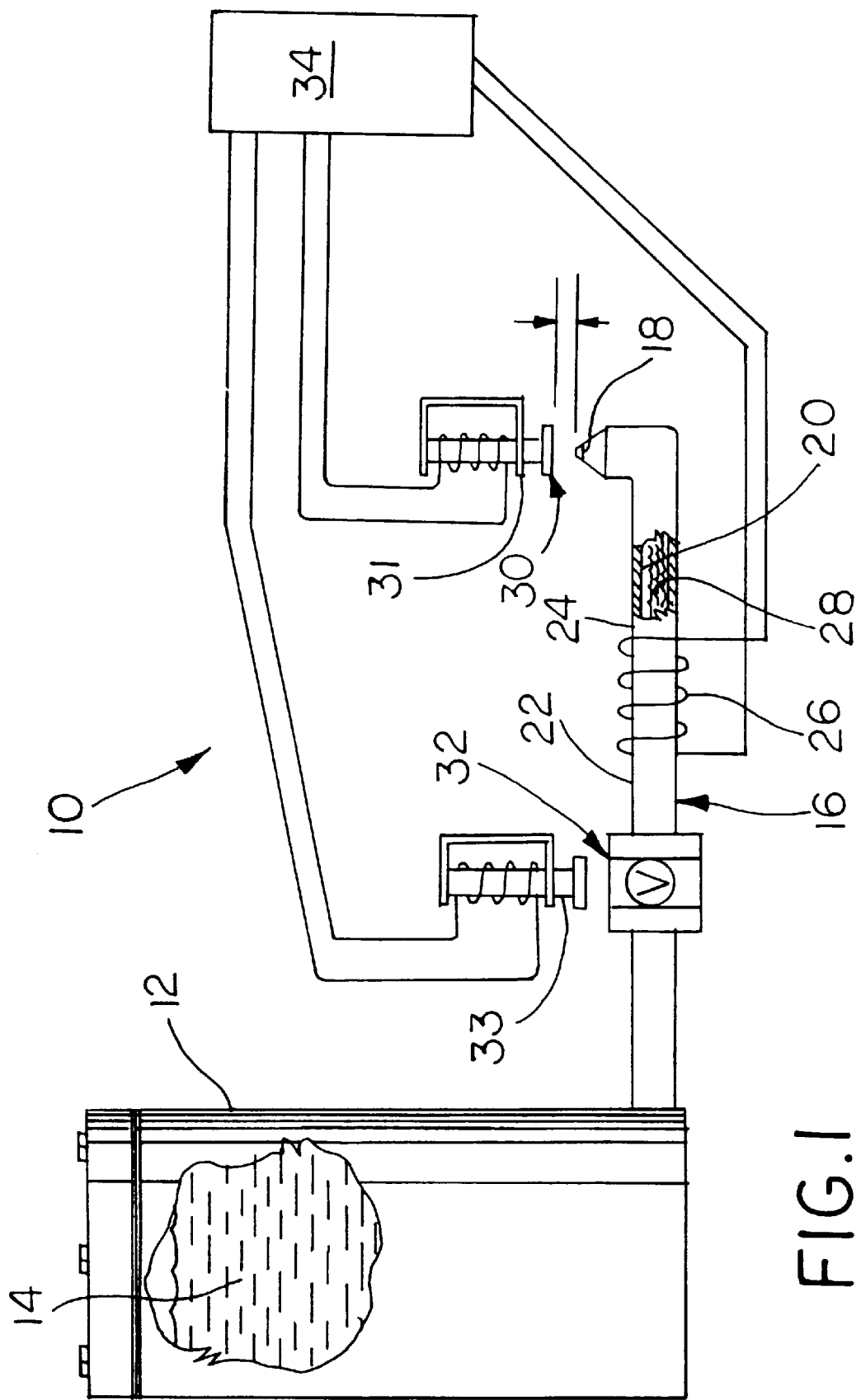
FIG. 1 is a schematic view, partly in section, of the leak sensor calibrating device according to the present invention.

The embodiment described herein is not intended to limit the invention to precise form disclosed. Rather, the embodiment has been chosen and described in order to enable those skilled in the art to follow the teachings of the present invention.

Referring now to the drawing, a calibration device incorporating the features of the present invention is generally referred to by the reference numeral 10. Device 10 is typically placed closely adjacent to a leak detector or sensor (not shown), which in turn is typically placed closely adjacent to the system which is to be monitored for leakage, such as a valve, a pipe system or seal, or other non-point emission source (not shown). Device 10 includes a reservoir 12 which contains a quantity of liquid analyte calibrant 14, which is preferably the same material as is running through the valve to be monitored.

Device 10 includes a conduit 16 which extends between the reservoir 12 and an outlet nozzle 18. Conduit 16 includes a bore 20 extending therethrough. Conduit 16 further includes an intermediate or central portion 22, a portion of which defines a dosing chamber 24. Dosing chamber 24 is preferably of predetermined volume, which for purposes of the preferred embodiment is in the range of 2 microliters ($2\times10^{-6}$ cubic centimeters). Conduit 16 is preferably constructed of stainless steel tubing having an inside diameter of 0.008 inches and an outside diameter of 0.050 inches, or any other suitable thickwall small diameter tubing. A thermal activator 26, which is preferably a resistive coil or a radio frequency heating unit, surrounds the conduit 16 adjacent the dosing chamber 24, enabling the activator 26 to heat a measured quantity 28 of calibrant 14 contained within the dosing chamber 24. The measured quantity 28 is preferably determined by the internal volume of the dosing chamber 24, such that the proper measured quantity 28 is present upon the dosing chamber being filled with calibrant 14. Alternatively, the measured quantity 28 may be determined by metering the flow of calibrant 14 into the dosing chamber 24 using known methods. The thermal activator 26 is preferably capable of bringing the measured quantity 28 contained within the dosing chamber 24 to its boiling point very quickly, as in the range of about 10 milliseconds.

An outlet valve 30 having a magnetically coupled actuator 31 is located at outlet nozzle 18, and is shiftable between an open position in which the bore 20 (and dosing chamber 24) are in flow communication with the surrounding atmosphere, and a closed position in which the bore 20 (and dosing chamber 24) are isolated from the surrounding atmosphere. A second valve 32 having a magnetically coupled actuator 33 is disposed along conduit 16 between dosing chamber 24 and reservoir 12. Valve 32 is shiftable between an open position in which dosing chamber 24 is in flow communication with reservoir 12, and a closed position in which the dosing chamber 24 is isolated from the reservoir 12. Preferably, each of valves 30, 32 are remotely operable from a common control system 34. Control system 34 is also used to energize the thermal activator 26 as will be discussed in greater detail below. Further, the pneumatic impedance through valve 30 is preferably about fifty (50) times greater than the pneumatic impedance through valve 32, the importance of which will be discussed in greater detail below.

The elevation of the outlet nozzle 18 and associated valve 30 is higher then elevation of valve 32. Thus, if valve 32 does not close completely, the liquid analyte 14 is kept out of contact with the seat of valve 30. Valve 30 preferably includes a chemically resistant soft rubber seat, such as a material sold under the tradename Viton, and is coated with Teflon. The Teflon coating prevents calibrant absorption into the Viton seat, thus preventing "off-gassing". The closure force of valve 30 may be relatively low, such as in the range of 25 psi of closure force on nozzle 18.

In operation, when the device 10 is inactive, valve 30 is closed, valve 32 is open, and the calibrant 14 in reservoir 12 is free to flow into the dosing chamber 24. When it is desired to activate the device 10, control system 34 closes valve 32, thus seriously impeding or preventing flow between the dosing chamber 24 and the reservoir 12, and thermal activator 26 is energized. Simultaneously, or shortly thereafter, valve 30 is opened. The now vaporized calibrant 14 contained within dosing chamber 24 is at its boiling point, and is ejected through the open nozzle 18. At that point, the exhausted calibrant can be mixed with a known quantity of atmosphere from around a valve for measuring or predicting its leak emissions. The leak sensor (not shown) can be calibrated by comparing the obtained sensor reading to empirical data, or by using other known methods.

Alternatively, the impedance between the dosing chamber 24 and the reservoir 12 may be achieved using a mechanical restriction rather than a closeable valve. Also, in less severe environments or in environments where inertial dispersion of calibrant is not expected, it is conceivable that surface tension and pneumatic impedance may be sufficient to prevent evaporation as well as backward flow of the calibrant, thus making it possible to dispense with one or both of the valves.

It will be understood that the above description does not limit the invention to the above-given details. It is contemplated that various modifications and substitutions can be made without departing from the spirit and scope of the following claims.

What is claimed:

1. A leak sensor calibration device, comprising:
    a reservoir for storing a liquid calibrant;
    a conduit in flow communication with the reservoir, a portion of the conduit defining a dosing chamber for storing a measured quantity of the calibrant;
    an outlet nozzle in flow communication with the dosing chamber; and
    a thermal activator adjacent the dosing chamber for vaporizing the measured quantity of calibrant in the dosing chamber and ejecting the measured quantity through the outlet nozzle.

2. The device of claim 1, including a remotely operated valve at the outlet nozzle, the valve being shiftable between a closed position wherein the dosing chamber is isolated from the surrounding atmosphere to an open position wherein the dosing chamber is in flow communication with the surrounding atmosphere.

3. The device of claim 1, including a remotely operated valve disposed between the reservoir and the dosing chamber, the valve being shiftable between a closed position wherein the reservoir is isolated from the dosing chamber and an open position wherein the reservoir is in flow communication with the dosing chamber for filling the dosing chamber with the calibrant.

4. The device of claim 1, including first and second remotely operated valves, the first valve being located at the outlet nozzle, the first valve being shiftable between a closed position wherein the dosing chamber is isolated from the surrounding atmosphere to an open position wherein the dosing chamber is in flow communication with the atmosphere, the second valve being disposed between the reservoir and the dosing chamber, the second valve being shiftable between a closed position wherein the reservoir is isolated from the dosing chamber and an open position wherein the reservoir is in flow communication with the dosing chamber.

5. The device of claim 4, wherein the valves are electrically operated, and further including a control system for remotely operating the valves and for energizing the thermal activator.

6. The device of claim 5, wherein the control system maintains the second valve in the closed position and the first valve in the open position when the activator is energized.

7. The device of claim 1, wherein the thermal activator is a resistive coil.

8. The device of claim 1, wherein the thermal activator is a radio frequency unit.

9. The device of claim 1, wherein the thermal activator supplies a thermal gradient sufficient to vaporize the calibrant in the dosing chamber in about 10 milliseconds.

10. A leak sensor calibrating device, comprising:
    a reservoir for storing a liquid calibrant;

a conduit in flow communication with the storage reservoir, the conduit terminating in an outlet nozzle and having a central portion defining a dosing chamber for storing a measured quantity of the liquid calibrant;

a thermal activator for heating the measured quantity of liquid calibrant in the dosing chamber;

a valve system for isolating the outlet nozzle from the surrounding atmosphere when the thermal activator is inactive and further for isolating the dosing chamber from the reservoir when the thermal activator is active; and a control system operatively connected to the valve system and the thermal activator.

11. A leak sensor calibration device for injecting a metered quantity of vaporized liquid material in the vicinity of a leak sensor, the device comprising:

a reservoir for storing the liquid material;

a conduit in flow communication with the reservoir, a portion of the conduit defining a dosing chamber for storing the metered quantity of the liquid material, the conduit further including an impeding portion for restricting the flow of the liquid material from the dosing chamber back to the reservoir;

an outlet nozzle in flow communication with the dosing chamber; and a thermal activator adjacent the dosing chamber for vaporizing the liquid material in the dosing chamber thereby ejecting the vaporized material through the outlet nozzle to the atmosphere.

12. The device of claim 11, wherein the impeding portion is a remotely operated valve disposed between the reservoir and the dosing chamber, the valve being shiftable between a closed position wherein the reservoir is isolated from the dosing chamber and an open position wherein the reservoir is in flow communication with the dosing chamber.

13. The device of claim 12, wherein the valve is remotely operable.

14. The device of claim 11, including a remotely operated outlet valve at the outlet nozzle, the valve being shiftable between a closed position wherein the dosing chamber is isolated from the surrounding atmosphere to an open position wherein the dosing chamber is in flow communication with the surrounding atmosphere.

15. The device of claim 11, including an first valve at the outlet nozzle and wherein the impeding portion includes a second valve, each of the valves being remotely operable, the first valve being shiftable between a closed position wherein the dosing chamber is isolated from the surrounding atmosphere to an open position wherein the dosing chamber is in flow communication with the atmosphere, the second valve being disposed between the reservoir and the dosing chamber, the second valve being shiftable between a closed position wherein the reservoir is isolated from the dosing chamber and an open position wherein the reservoir is in flow communication with the dosing chamber.

16. The device of claim 15, wherein the valves are electrically operated, and further including a control system for controlling the valves and for energizing the thermal activator.

17. The device of claim 16, wherein the control system maintains the second valve in the closed position and the first valve in the open position when the activator is energized.

18. The device of claim 11, wherein the elevation of the outlet is disposed above the elevation of the impeding portion.

19. The device of claim 11, wherein the pneumatic impedance through the impeding portion is about fifty times greater than the pneumatic impedance through the outlet nozzle.

20. The device of claim 11, wherein the volume of the dosing chamber is about $2 \times 10^{-6}$ liters.

* * * * *